(12) United States Patent
Falk et al.

(10) Patent No.: US 7,102,901 B2
(45) Date of Patent: Sep. 5, 2006

(54) MEDIUM FREQUENCY ENERGY SUPPLY FOR RAIL VEHICLES

(75) Inventors: Andreas Falk, Kassel (DE); Mathias Victor, Braunschweig (DE); Guido Bachmann, Guxhagen (DE)

(73) Assignee: Alstom SA, Paris (FR)

( * ) Notice: Subject to any disclaimer, the term of this patent is extended or adjusted under 35 U.S.C. 154(b) by 210 days.

(21) Appl. No.: 10/058,454

(22) Filed: Jan. 28, 2002

(65) Prior Publication Data

US 2002/0101747 A1 Aug. 1, 2002

(30) Foreign Application Priority Data

Jan. 27, 2001 (DE) ................. 101 03 634

(51) Int. Cl.
*H02M 5/451* (2006.01)
(52) U.S. Cl. .......................... 363/65; 363/37
(58) Field of Classification Search ................. 363/65, 363/68, 71, 34, 35, 37; 307/43, 54, 61, 63, 307/77, 82
See application file for complete search history.

(56) References Cited

U.S. PATENT DOCUMENTS

| | | | |
|---|---|---|---|
| 4,825,348 A | 4/1989 | MacDonald et al. | |
| 4,946,206 A * | 8/1990 | Roe et al. | 285/369 |
| 5,088,017 A | 2/1992 | Yaginuma et al. | 363/21 |
| 5,121,315 A | 6/1992 | Moriya | 363/65 |
| 5,341,083 A * | 8/1994 | Klontz et al. | 320/109 |
| 6,181,079 B1 * | 1/2001 | Chang et al. | 315/247 |
| 6,324,080 B1 * | 11/2001 | Laeuffer | 363/25 |
| 6,388,904 B1 * | 5/2002 | Nomura | 363/71 |

FOREIGN PATENT DOCUMENTS

| | | |
|---|---|---|
| DE | 196 30 284 A1 | 1/1998 |
| DE | 198 17 752 A1 | 10/1999 |
| DE | 198 27 872 A1 | 12/1999 |
| DE | 198 47 267 A1 | 4/2000 |
| EP | 0 820 893 A2 | 7/1997 |

OTHER PUBLICATIONS

S. Östlund; Influence of the control principle on a high-voltage inverter system for reduction of traction-transformer weight; pp. 110-115; Publication No. XP 000113877, no date.

Carpita M. et al.; Preliminary Design Of A 18 KV Locomotive; vol. 2, Publication No. XP 000537737; Publication Date Sep. 19, 1995; pp. 2.153-2.158.

Der EuroSprinter; Publication No. XP 0000438165; pp. 50-61, no date.

Mizutani Tadao; Mult-connection Inverter; Publication No. 55120375; Publication Date Sep. 16, 1980.

(Continued)

*Primary Examiner*—Gary L Laxton
(74) *Attorney, Agent, or Firm*—Harness, Dickey & Pierce, P.L.C.

(57) ABSTRACT

Disclosed is an electronic circuit for the bidirectional conversion of a high input voltage to a direct-current output voltage with indirect coupling, more specifically such a circuit for use in a power supply system for rail vehicles, that is provided with a primary converter, one single common transformer and a secondary converter. The primary converter includes at least three primary converter sections connected in series, the output lines of which are each connected to a respective one of the transformer primary windings.

18 Claims, 4 Drawing Sheets

OTHER PUBLICATIONS

Yatsuno Tadashi; Rectifier; Publication No. 58179163; Publication Date Apr. 9, 1982.

Carpita M. et al.; Preliminary Design Approach by ATP Simulator of the 18 KV DC Traction System; pp. 2.766-2.771; Sep. 19, 1995.

Kuns M. et al., "Developing a Low-Mass Power Supply for Electric Rail Vehicles Development", vol. 123, No. 11/12, Nov. 1999, pp. 423-426, XP000877540.

Skarpetowski G., "Use of the Transformer Polygon Equivalent Circuit in the Analysis of the Input Converter in AC Traction Drives", 8th European Conference on Power Electronics and Applications. Lausanne, CH, Sep. 7-9, 1999, Epe. European Conference on Power Electronics and Applications, Brussels: EPE Association BE, vol. CONF. 8, Sep. 7, 1999, pp. 1-10, XP000878443.

\* cited by examiner

Fig. 6.1

MEDIUM FREQUENCY ENERGY SUPPLY FOR RAIL VEHICLES

This application claims priority of German Patent Application No. 101 03 634.5-32, filed Jan. 27, 2001, the entire contents of which are hereby incorporated by reference.

BACKGROUND OF THE INVENTION

1. Field of the Invention

The invention relates to an electronic circuit for bidirectional conversion of a high input voltage to a direct-current output voltage with indirect coupling, more specifically, an electronic circuit for use in a power supply system for rail vehicles.

2. Related Art

Nowadays, 16.7 Hz or 50 Hz transformers are utilized in rail vehicles to convert the high voltage of 15 kV or of 25 kV respectively in the overhead lines of a railroad system to the voltage of nearly 1000 V, whereby the value does not exceed the rating of silicon power components which are able to drive the electric motors. These transformers are disadvantageous because of their overall weight. This weight occasions loss of energy, which is undesirable since energy costs have to be saved to an ever increasing extent in rail vehicles as well. Their size, furthermore, considerably reduces the useful space available as complementary components may also be required to cope with other direct current voltage power supplies (1.5 kV DC, 3 kV DC).

The published application DE 198 17 752 A1 describes a feeding circuit for feeding an electric driver unit that supplies a plurality of drive groups including at least one driving motor and one input converter. Each input converter (thus fed by the equivalent ratio of the input voltage) is provided with a transformer to operate the driving motors of the separate secondary direct-current voltage circuits with different loads. To achieve that the load is uniformly distributed to the input converters of the individual drive groups, a compensating circuit which electrically links the driving converters together is provided. The choice of the described low fundamental frequencies of the transformer suggests that the transformer converters are operated in a non-resonant mode.

The circuit disadvantageously has an additional compensating circuit which is necessary because the converter sections are submitted to different loads. This makes the system even more complicated which increases the failure probability. Due to the hard switch operation of the transformer converters, the efficiency of the system is comparatively low. Taking the low frequency into account, the totality of the individual transformers is heavy in comparison to a comparable single transformer. It is also required to use as many motors as converters in order to be able to cope with the high voltage. This may lead to a significantly higher weight than conventional traction drivers (especially with 25 kV).

At least one of published German application 198 27 872 and European Patent No. 820 893 A2 describes a driving circuit for a rail vehicle consisting of mains series connection and of secondary parallel connection of converter sections, each converter section being provided with at least one transformer. Several secondary converter sections are furthermore utilized.

Taking into account the growth law for transformers, and due to the plurality of individual transformers, the circuit has the disadvantage that it has a high overall weight and that it involves accordingly higher costs compared to a system with but one transformer. The several secondary converter sections furthermore require considerable expenditure.

The publication Carpita M. et al, "Preliminary Design of a 18 kV locomotive", 19 Sep. 1995, EPE'95, 6$^{th}$ European Conference on Power Electronics and Applications, Sevilla, Sep. 19–21, 1995, Vol. 2, Page(s) 2.153–2.158, European Power Electronics and Drive's Association XP000537737 describes a feeder system for operating rail vehicles with 18 kV direct-current voltage systems. This system comprises a transformer with several associated converter sections. The transformers are allocated one or several secondary rectifiers. The operation of this circuit is unidirectional, i.e., the energy only flows from the overhead line to the vehicle drive so it is not possible to recover the breaking energy. Another drawback is that the input voltage of the primary converters of the transformer is directly determined by the overhead line. As a result thereof, operation in the resonant mode cannot be realized if the direct-current output voltage is to remain stable. Therefore, operation is hard switching with high losses and accordingly low efficiency. Furthermore, a change in the configuration topology for operation with an alternating voltage or with lower dc voltage is not possible.

SUMMARY OF THE INVENTION

It is an object of the present invention to provide an electronic circuit that avoids the aforementioned drawbacks.

This object, and other objects of the present invention, is solved in part by an electronic circuit for bidirectional conversion of a high input voltage to a direct-current output voltage with indirect coupling. The circuit includes a primary converter, a common transformer, and a secondary converter, wherein the primary converter includes at least three primary converter sections connected in series, the output lines of which are each connected to a respective one of a plurality of transformer primary windings.

The present invention is advantageous inasmuch as but one transformer and but one secondary converter are provided, which not only saves weight but also costs. The design of the circuit according to the present invention ensures operation in the resonant mode even in case of asymmetries of the transformer circuit and of asymmetries in the actuation, or of the semiconductors, respectively. As a result thereof, the one transformer solution constitutes a solid system that is also stable in series production. By changing the configuration of the primary converters from a series connection to a parallel connection, the circuit may advantageously be operated with direct-current voltage systems of e.g. 1.5 kV or 3 kV as well (FIG. 8). With a direct-current voltage of 1.5 kV, the voltage of the contact wires may alternatively also be directly connected to the secondary intermediate circuit.

The circuit in accordance with the present invention is provided with several primary converter sections that are operated directly, by way of a switch and a filter, between an overhead line and a vehicle wheel grounded through a rail. The converter sections are allocated to the respective one of a transformer primary winding of a transformer and are provided with one mains four-quadrant regulator and with one transformer primary converter. The transformer has a secondary winding that is allocated to a transformer secondary converter.

BRIEF DESCRIPTION OF THE DRAWINGS

The present invention and further advantages thereof will become apparent from the description of the figures.

DETAILED DESCRIPTION OF THE PREFERRED EMBODIMENTS

Figure 1:
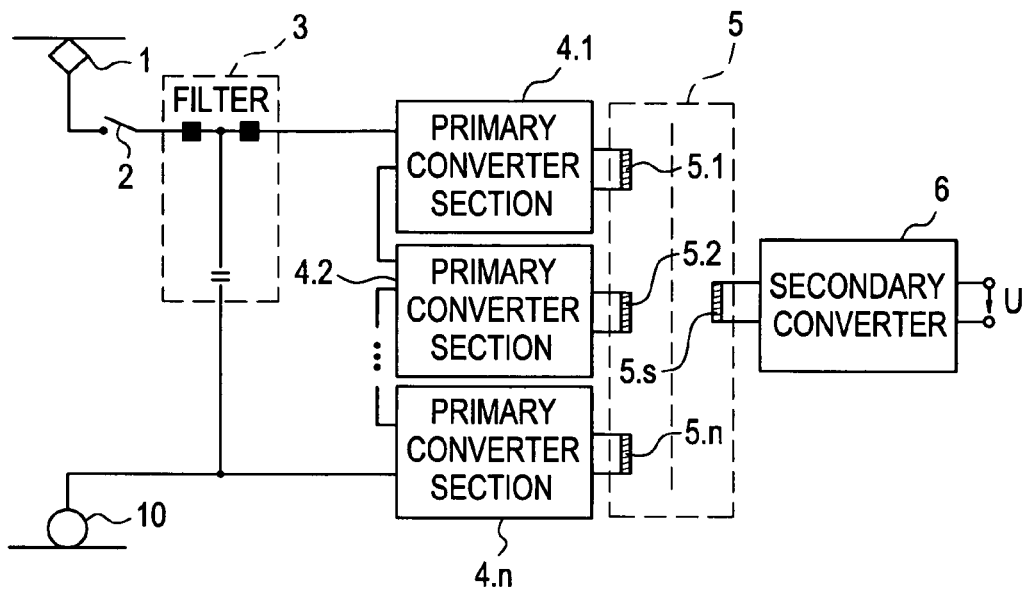
FIG. 1 is a view of a circuit arrangement according to the present invention.
Figure 2:
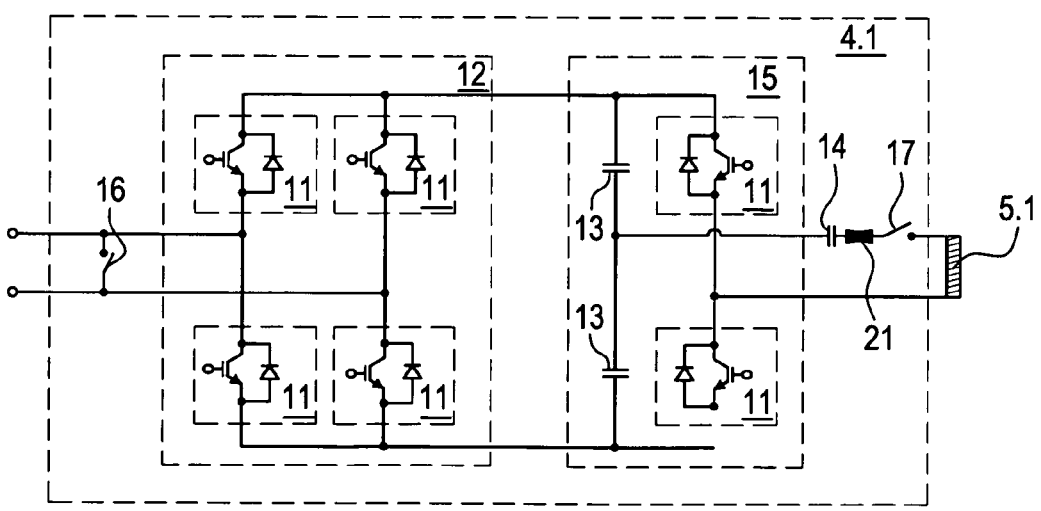
FIG. 2 is a view of a portion of the circuit arrangement according to FIG.
Figure 3:
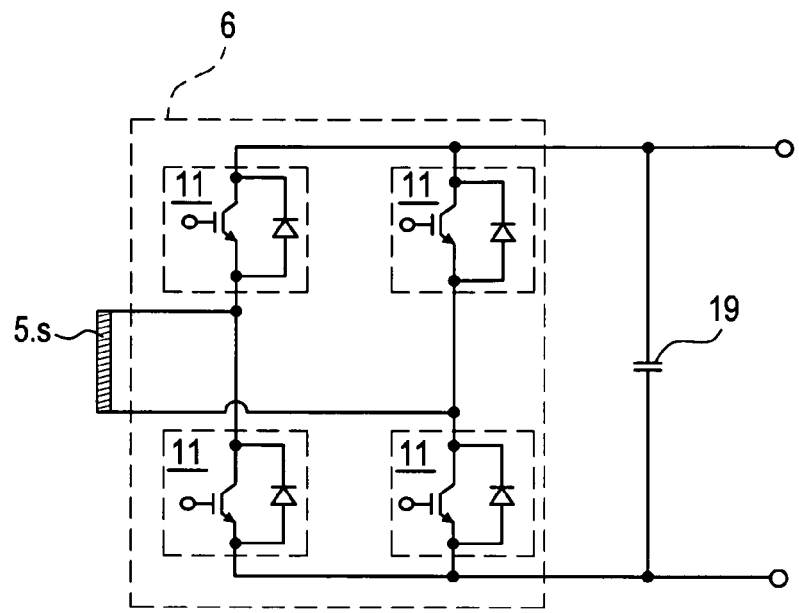
FIG. 3 is a view of a circuit of a secondary converter.

In a preferred embodiment (FIGS. 1 & 2), the circuit according to the present invention is provided with several primary converter sections 4.1–4.n that are operated directly, by way of a switch 2 and a filter 3, between an overhead line 1 and a vehicle wheel 10 grounded through a rail. The primary converter sections 4.1–4.n are allocated to the respective one of a transformer primary winding 5.1–5.n of a transformer 5 and include one mains four-quadrant regulator 12 in the form of a full bridge with four circuit elements 11 each, each circuit element having one transistor and one free-wheeling diode, and of one half bridge 15 with two circuit elements 11 each, each circuit element having one transistor and one free-wheeling diode and capacitors 13; the half-bridge may be replaced by a full bridge, if so desired. The transformer 5 has a secondary winding that feeds a directly-current voltage intermediate circuit through a secondary converter 6 (FIG. 3).

In accordance with a preferred embodiment of the present invention, the half bridge 15 is operated in the resonant mode, one series resonance capacitor 14 forming an oscillating circuit with the corresponding primary leakage inductance coil of the transformer. In order to guarantee the operation at high clock frequency rates in the resonant mode as it is aimed at, the design of the feeding system according to the present invention is such that the structure of the resonance circuit is symmetrical with regard to the electric and magnetic properties, that the decoupling of the primary converters has a particular design, which is due to the design of the resonance circuit, and that the input converters are provided with a special control.

Figure 4:
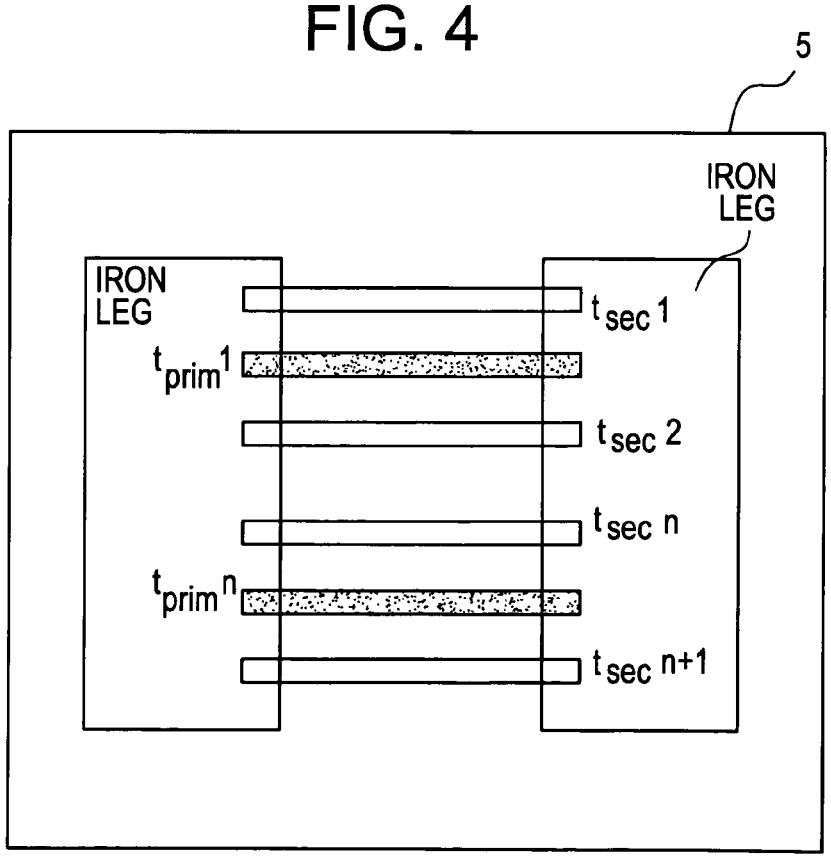
FIG. 4 is a basic illustration of a transformer.

The transformer 5 (FIG. 4) is built in the shape of discs in order to improve the coupling properties and to equalize the electric and magnetic properties, or to provide the symmetrical structure in accordance with the present invention respectively. All of the windings are arranged on one common iron leg. The number of secondary part windings tsec 1–tsec n+1 are subdivided into such number of part windings that enables the arrangement of each of the n-primary windings between two secondary part windings. The secondary part windings are connected either in series or in parallel.

Figure 5:
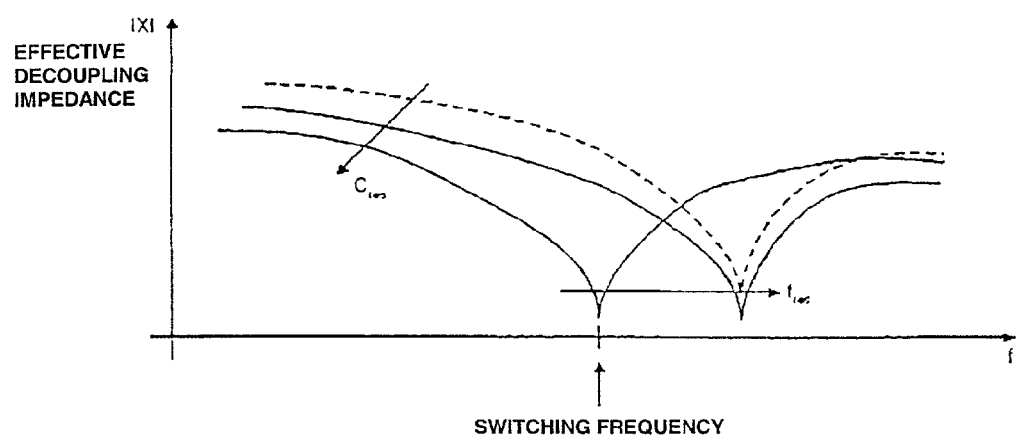
FIG. 5 illustrates a transfer function of the resonant circuit.

The elements that determine the resonance frequency, i.e., series resonance capacitor 14 and leakage inductance coil of transformer 5, are designed in such a manner that the resonance frequency of e.g. 7 kHz is higher than the switching frequency of e.g. 5 kHz of the semiconductors. The ratio of the resonance frequency to the switching frequency should at least be 1.2-fold. As a result thereof, the decoupling impedance between the primary converter sections can be increased at a given switching frequency (see FIG. 5). As may be surveyed from FIG. 5, the efficient decoupling impedance tends to zero when the resonance frequency is chosen to equal the switching frequency. Furthermore, in operation with nominal power, the ratio of the impedances of this resonance circuit is selected such that there is a considerable alternating voltage drop at the series resonance capacitor 14, the voltage amounting for example to half of the no-load voltage of the transformer. As the capacity of the resonance capacitor drops, this alternating-current voltage increases. As can be seen in FIG. 5, the decoupling impedance increases as the capacity of the resonance capacitor drops. Accordingly, the decoupling impedance between two primary converter sections 4.1–4.n is chosen such that differences in the intermediate circuit between capacitors 13 of primary converter sections 4.1–4.n merely result in relatively small compensating currents. The switching losses of the semiconductors are minimized as a result thereof. The capacitors 13 are connected in accordance with FIG. 2.

Figure 6:
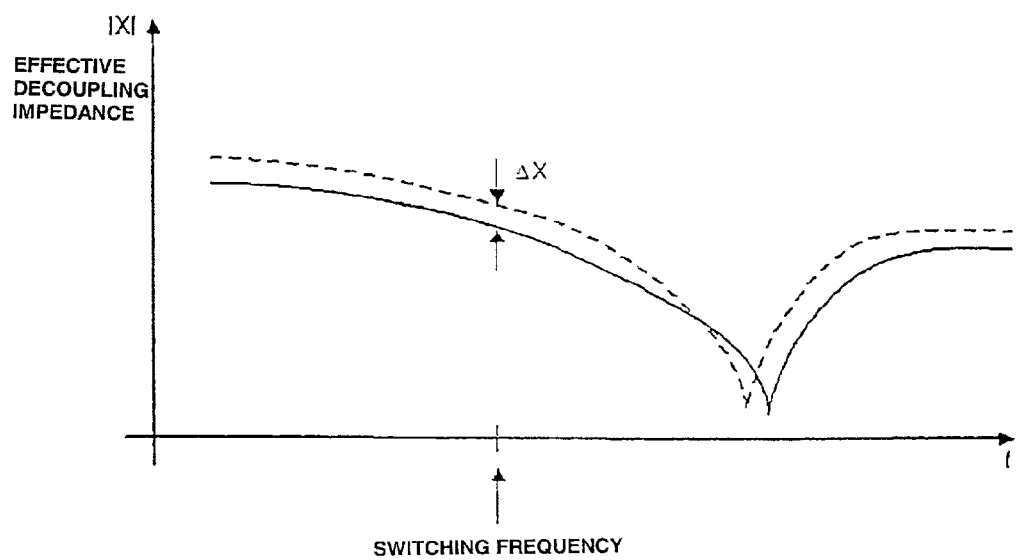
FIG. 6 illustrates a residual asymmetry of the resonance circuit.

Furthermore, the control (claim 12) in the mains converter circuit 12 of primary converter sections 4.1–4.n allows, in addition to the control of the power consumption, a superimposed intermediate circuit voltage control that actively minimizes the compensating currents occasioned by static residual asymmetries (FIG. 6) in the primary resonance circuit impedances by giving the intermediate circuit voltage an individual value. The necessary divergences of the intermediate circuit voltages are thereby proportional to the asymmetries of the decoupling impedance and amount to less than 5% for example. This is to say that the same transformer primary currents occur with varied impedances and varied intermediate circuit voltages. The compensating currents are minimized as a result thereof.

In the so-called feed mode of operation, the transistors of the half bridge 15 in the primary converter sections 4.1 to 4.n are clocked in synchronism and agreed in phase. The transistors in the secondary converter 6 remain locked so that only the diodes in the secondary converter 6 are active.

In contrast, in the so-called recuperation feed mode of operation, the transistors of the secondary converter 6 are clocked. The transistors in the half bridges 15 remain locked thereby so that only the diodes of these converters are active.

Figure 7:
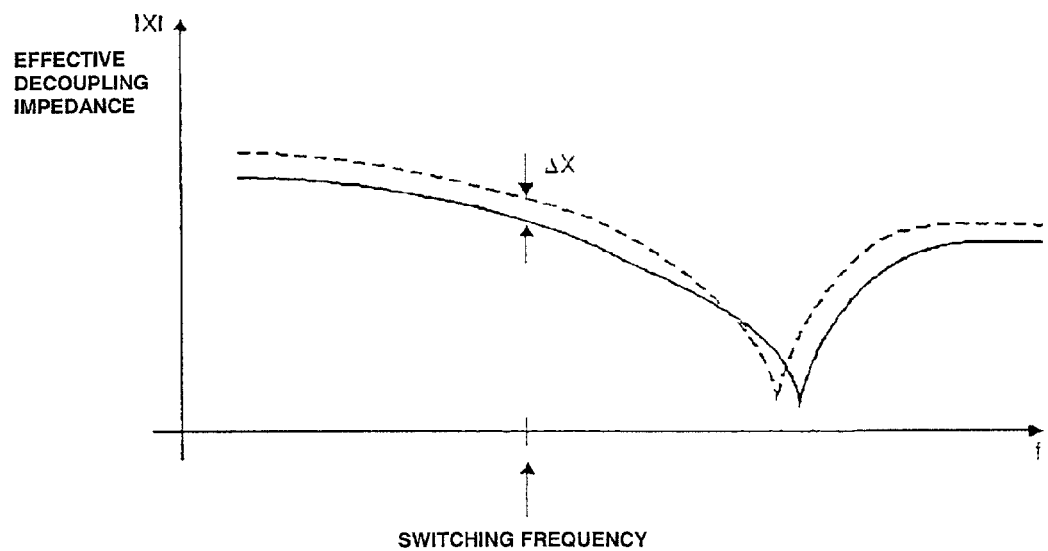
FIG. 7 illustrates a transformer current in operation in the resonant mode.
Figure 7:
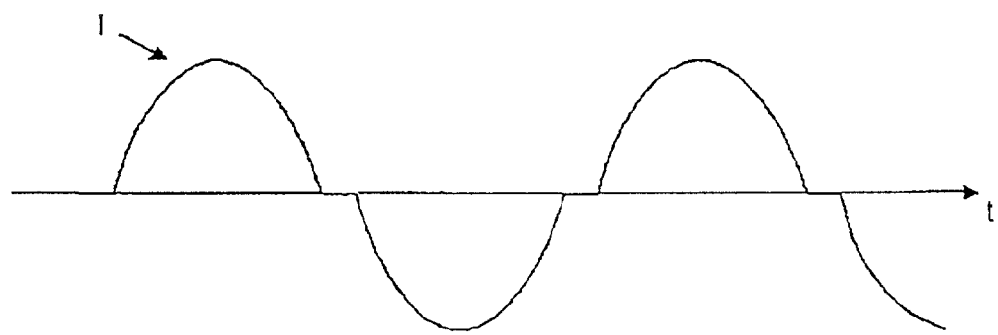

In the feed mode and in the recuperation mode of operation, the transformer currents are almost half sine waves (FIG. 7) so that the current may be switched lossless. As a result thereof, there is very little loss in the half bridges 15 and in the transformer 5 and the operating properties are accordingly good. In the feed mode of operation, the primary intermediate circuit voltage, which drops at the capacitors 13 as cumulative voltage and which is multiplied by 0.5 Ü (transformation ratio between every transformer primary winding 5.1 to 5.n and the secondary winding) and corrected by the voltage drop at the transformer, is higher than the direct-current output voltage Ua. In the recuperation mode of operation however, the accordingly rated primary intermediate circuit voltage is smaller than the direct-current output voltage Ua. The output voltage Ua is suitably controlled by determining input current from the line.

The sum of the primary intermediate circuit voltages is always higher than the peak value of the mains voltage. Thanks to the capacitors 13 with high capacity, which are earmarked for serving as intermediate circuit capacitors and which are not used a resonance elements, the protection against excessive input voltages is very good.

Figure 8:
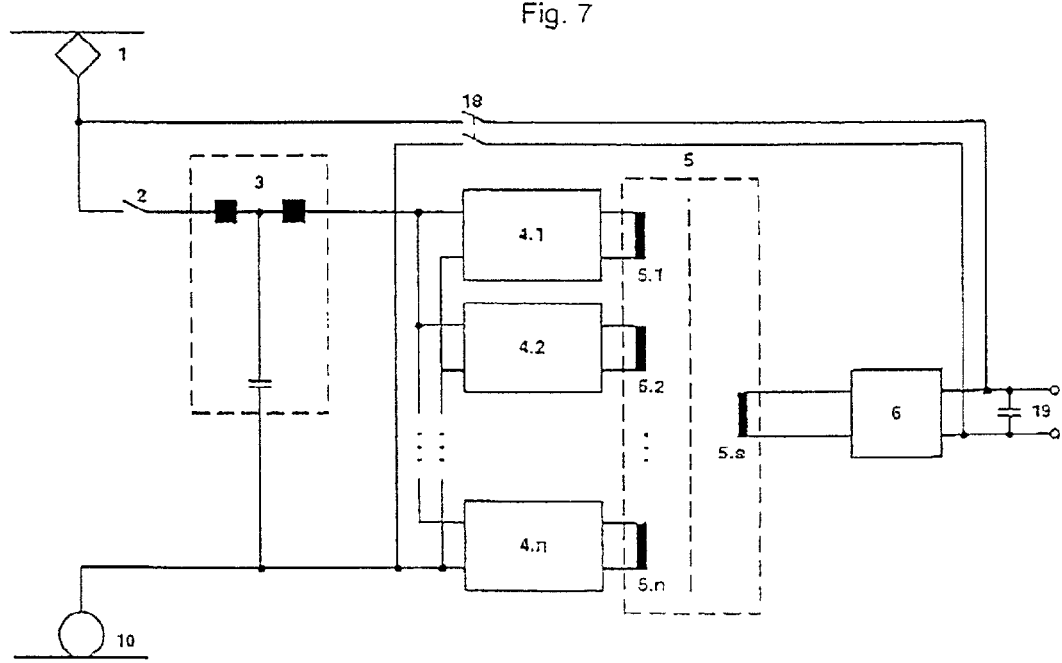
FIG. 8 is a view of a multisystem circuit operated with direct-current voltage.

The configuration of the mains series connection of the primary converters 4.1 though 4.n can be changed to a parallel connection by way of mechanical switches (FIG. 8)

for operation with a direct-current voltage. In direct current voltage mains of low voltage, e.g., 1500 V/DC, the mains voltage can be connected direct to the output of the secondary converter 6 by way of the two-pole mechanical switch 18.

When a failure occurs in one of the primary converter sections 4.1 through 4.n, the converter section may be bridged by way of the mechanical switch 16 and separated from transformer 5 by the mechanical switch 17. The remaining n−1 primary converter sections may then maintain operation.

To achieve a uniform resonance circuit impedance, an additional inductance coil 21 may be connected in series with the resonance capacitor 14.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. An electronic circuit for bidirectional conversion of a high input voltage to a direct-current output voltage with indirect coupling, comprising:
    a resonance circuit including a common transformer and a capacitor array, the common transformer including a plurality of primary windings and a single secondary winding;
    a single secondary converter connected to the single secondary winding; and
    a primary converter including at least three primary converter sections connected in series, output lines of each of the at least three primary converter sections being connected to a respective one of the plurality of primary windings of the common transformer, each primary winding of the common transformer being allocated one resonance capacitor, the resonance capacitors forming an oscillating circuit with a leakage inductance coil of the common transformer,
    wherein the capacitor array includes a symmetrical magnetic and electric structure for lossless switching operation, and wherein the transformer, the capacitor array, and a respective resonance frequency and switching frequency are selected such that each of the primary converter sections are decoupled, and wherein for a resonance frequency, a ratio of impedances of the leakage inductance coil to the capacitor array is chosen so that an effective value of an alternating voltage of at least one of the capacitors in nominal operation is at least ⅓ of a no-load voltage of a transformer of a primary winding.

2. The electronic circuit of claim 1, wherein the at least three primary converter sections each include one input four-quadrant regulator, at least one intermediate circuit capacitor and one half bridge.

3. The electronic circuit of claim 1, wherein the oscillating circuit has a relatively high efficient decoupling impedance.

4. The electronic circuit of claim 1, wherein the at least three primary converter sections each include one input four-quadrant regulator, at least one intermediate circuit capacitor and one half bridge and wherein a resonance frequency of the oscillating circuit is at least equal to a switching frequency, occurring with the at least three primary converter sections and produced by the half bridge.

5. The electronic circuit of claim 1, wherein the high input voltage is one of an alternating-current and a direct-current voltage.

6. The electronic circuit of claim 1, wherein each respective switching frequency is at least 1.2 times smaller than the resonance frequency.

7. The electronic circuit of claim 1, wherein control of the electronic circuit is devised in such a manner that residual asymmetries of the resonance circuit are compensated by a control which is performed by way of a mains four-quadrant regulator.

8. The electronic circuit according to claim 7, wherein the electronic circuit is operatable in such a manner that, in case of failure in one of the primary converter sections, the failed converter section is set out of operation and the remaining primary converter sections take over operation of the circuit.

9. The electronic circuit according to claim 1, wherein the primary converter and the secondary converter are operatable in synchronism and in a resonant mode of operation, wherein, in a feed mode of operation, only switches of any half bridges are clocked, whereas in a recuperation mode of operation, only switches of the secondary converter are clocked.

10. The electronic circuit according to claim 1, wherein the at least three primary converter sections each include one input four-quadrant regulator, at least one intermediate circuit capacitor and one full bridge.

11. The electronic circuit according to claim 1, wherein the circuit is designed in such a manner that the at least three primary converter sections are operated directly from an AC mains through a switch and an input filter.

12. The electronic circuit of claim 11, wherein the input filter is designed as a choke.

13. The electronic circuit of claim 1, wherein in order to achieve a uniform resonance circuit impedance, one additional inductance coil is provided in series with each transformer primary winding.

14. The electronic circuit of claim 1, wherein the electronic circuit is for use in a power supply system for rail vehicles.

15. The electronic circuit of claim 1, wherein each respective switching frequency is at least 1.4 times smaller than the resonance frequency.

16. The electronic circuit of claim 1, wherein for a resonance frequency, a ratio of impedances of the leakage inductance coil to the capacitor array is chosen so that an effective value of an alternating voltage of the resonance capacitor in nominal operation is ½ of a no-load voltage of a transformer of a primary winding.

17. An electronic circuit for bidirectional conversion of a high input voltage to a direct-current output voltage with indirect coupling, comprising:
    a resonance circuit including a common transformer and a capacitor array, the common transformer including a plurality of primary windings and a single secondary winding;
    a single secondary converter connected to the single secondary winding; and
    a primary converter including at least three primary converter sections connected in series, output lines of each of the at least three primary converter sections being connected to a respective one of the plurality of primary windings of the common transformer, each primary winding of the common transformer being allocated one resonance capacitor, the resonance capacitors forming an oscillating circuit with a leakage inductance coil of the common transformer, wherein the capacitor array includes a symmetrical magnetic and electric structure for lossless switching operation, wherein the transformer, the capacitor array, and a respective resonance frequency and switching frequency are selected such that each of the primary converter sections are decoupled, and wherein mutual coupling of the transformer primary windings and respective coupling to the single secondary winding is a symmetrical magnetic coupling achieved in that the respective transformer primary windings have the same magnetic design and are arranged in the shape of discs between two of a plurality of secondary part windings of the single secondary winding that are connected in parallel or in series and that are linked to a secondary converter system, provided with a direct-current output voltage intermediate circuit.

18. An electronic circuit for bidirectional conversion of a high input voltage to a direct-current output voltage with indirect coupling, comprising:
 a resonance circuit including a common transformer and a capacitor array, the common transformer including a plurality of primary windings and a single secondary winding;
 a single secondary converter connected to the single secondary winding; and
 a primary converter including at least three primary converter sections connected in series, output lines of each of the at least three primary converter sections being connected to a respective one of the plurality of primary windings of the common transformer, each primary winding of the common transformer being allocated one resonance capacitor, the resonance capacitors forming an oscillating circuit with a leakage inductance coil of the common transformer, wherein the capacitor array includes a symmetrical magnetic and electric structure for lossless switching operation, wherein the transformer, the capacitor array, and a respective resonance frequency and switching frequency are selected such that each of the primary converter sections are decoupled, wherein control of the electronic circuit is devised in such a manner that residual asymmetries of the resonance circuit are compensated by a control which is performed by way of a mains four-quadrant regulator, and, wherein a superimposed intermediate circuit voltage control is realized by the four-quadrant regulator of the respective one of the primary converter sections, the intermediate circuit voltage control compensating a static residual asymmetry of the resonance circuit so that the intermediate circuit voltages of the primary converter sections can differ.

* * * * *